US012798465B2

(12) United States Patent
Tan et al.

(10) Patent No.: US 12,798,465 B2
(45) Date of Patent: Nov. 17, 2026

(54) DELIVERY ROBOT

(71) Applicant: SHENZHEN PUDU TECHNOLOGY CO., LTD., Guangdong (CN)

(72) Inventors: Haozhi Tan, Shenzhen (CN); Zhonghui Huang, Shenzhen (CN); Wenjie Zhang, Shenzhen (CN); Xiaolong Yan, Shenzhen (CN); Kuan Wang, Shenzhen (CN)

(73) Assignee: SHENZHEN PUDU TECHNOLOGY CO., LTD., Shenzhen (CN)

( * ) Notice: Subject to any disclaimer, the term of this patent is extended or adjusted under 35 U.S.C. 154(b) by 453 days.

(21) Appl. No.: 18/568,683

(22) PCT Filed: Jun. 16, 2022

(86) PCT No.: PCT/CN2022/099209
§ 371 (c)(1),
(2) Date: Dec. 8, 2023

(87) PCT Pub. No.: WO2022/262816
PCT Pub. Date: Dec. 22, 2022

(65) Prior Publication Data

US 2024/0270148 A1 Aug. 15, 2024

(30) Foreign Application Priority Data

Jun. 18, 2021 (CN) ........................ 202121371521.X
Jun. 18, 2021 (CN) ........................ 202121372227.0
Mar. 16, 2022 (CN) ........................ 202220580723.3

(51) Int. Cl.
*A47F 10/06* (2006.01)
*B60P 3/025* (2006.01)

(52) U.S. Cl.
CPC ............ *B60P 3/0257* (2013.01); *A47F 10/06* (2013.01)

(58) Field of Classification Search
CPC .... A47B 2031/003; B25J 19/00; A47F 10/06; A47G 23/08; B60K 3/02; B60K 3/002; B65G 1/137
See application file for complete search history.

(56) References Cited

U.S. PATENT DOCUMENTS

| | | | | |
|---|---|---|---|---|
| 9,682,482 | B2 | 6/2017 | Ohara | |
| 10,654,394 | B2 * | 5/2020 | Goldberg | B60P 3/0257 |
| 2023/0150769 | A1 * | 5/2023 | Al | B25J 5/007 700/214 |

FOREIGN PATENT DOCUMENTS

| | | | |
|---|---|---|---|
| CN | 106826858 | A | 6/2017 |
| CN | 108748191 | A | 11/2018 |

(Continued)

OTHER PUBLICATIONS

Extended European Search Report for corresponding Application No. 22824289.7, dated Aug. 29, 2024, 8 pages.

(Continued)

*Primary Examiner* — Marc Q Jimenez
*Assistant Examiner* — James J Triggs
(74) *Attorney, Agent, or Firm* — OPENPTO US LLC; Yuhao Liang

(57) ABSTRACT

A delivery robot includes: a mobile chassis and a housing provided on the mobile chassis. The housing comprises a bottom plate, at least two first supporting members, and a top plate; the bottom plate is provided at the top of the mobile chassis, and the at least two first supporting members are provided between the bottom plate and the top plate, and are respectively located on two sides of a front end or two sides of a rear end of the bottom plate, wherein the front end of the bottom plate is a front surface of the housing, and the rear end of the bottom plate is a back surface of the housing.

17 Claims, 16 Drawing Sheets

(56) References Cited

FOREIGN PATENT DOCUMENTS

| | | | |
|---|---|---|---|
| CN | 109955243 | A | 7/2019 |
| CN | 110919663 | A | 3/2020 |
| CN | 212497775 | U | 2/2021 |
| CN | 215701727 | U | 2/2022 |
| CN | 216271536 | U | 4/2022 |
| JP | 08154841 | A | 6/1996 |
| KR | 20200085658 | | 7/2020 |
| WO | WO2021104170 | A1 | 6/2021 |

OTHER PUBLICATIONS

"Office Action of Korea Counterpart Application", issued on Jan. 16, 2026, p. 1-p. 9.

International Search Report (with English translation) for corresponding Application No. PCT/CN2022/099209, dated Sep. 22, 2022, 6 pages.

* cited by examiner

DELIVERY ROBOT

CROSS-REFERENCE TO RELATED APPLICATIONS

This application is an U.S. national phase application under 35 U.S.C. § 371 based upon international patent application No. PCT/CN2022/099209, filed on Jun. 16, 2022, which itself claims priority of Chinese Patent Application No. 202121371521.X, filed on Jun. 18, 2021, entitled "DELIVERY ROBOT", Chinese Patent Application No. 202220580723.3, filed on Mar. 16, 2022, entitled "STRUCTURE OF CASING AND ROBOT", and Chinese Patent Application No. 202121372227.0, filed on Jun. 18, 2021, entitled "DELIVERY ROBOT". The disclosures of the aforementioned applications are hereby incorporated in their entireties by reference.

TECHNICAL FIELD

The present disclosure relates to the technical field of robots, in particular to a delivery robot.

BACKGROUND

Mobile robots have been gradually applied to public service scenarios. For example, more and more mobile robots are used in restaurants, office buildings, and hotels to provide delivery services.

The design of mobile robots not only needs to pay attention to a structural strength and a stability of supports, but also pays more and more attention to a universality of the robot, otherwise the application of the robot may be limited. Mobile robots in the prior art generally design support structures in the middle of two sides of a casing. This design determines that they can only be adapted to large arc door plates. However, it is difficult to install large arc door plates, so that the robot with the support structure provided in the middle of two sides of the casing are usually put into use without door plates.

However, the usage scenarios of the robot without the door plate will be limited. For example, the confidentiality of the delivery of goods is poor, it cannot be applied to some occasions requiring high privacy, and when transporting food, the safety protection of the food in the process of food transportation is poor. If the transport environment is not clean enough, the transported food is likely to be contaminated.

Therefore, under the premise of ensuring the structural strength and support stability of the mobile robot, how to improve the universality of structural design of the robot and broaden the usage scenarios of the robot is a problem worthy of attention.

SUMMARY

Technical Problem

According to various embodiments of the present disclosure, a delivery robot is provided.

Technical Solution

A delivery robot includes a mobile chassis and a casing provided on the mobile chassis. The casing includes a bottom plate, at least two first support members, and a top plate. The bottom plate is provided on a top portion of the mobile chassis, the at least two first support members are provided between the bottom plate and the top plate, the at least two first support members are respectively located on two sides of a front end or a rear end of the bottom plate. The front end of the bottom plate is a front side of the casing, and the rear end of the bottom plate is a back side of the casing.

Beneficial Effect

According to above-mentioned delivery robot, the first support is provided on two sides of the front end or two sides of the rear end of the bottom plate. Since the position of the first support is closer to the end portion of the bottom plate, no matter it is a flat door plate or a door plate with a small arc surface, the door plate can be easily mounted on the first support, allowing a user to choose to put it into use with or without the door, which broadens the usage scenarios of the delivery robot.

Details of one or more embodiments of the present disclosure are set forth in the following drawings and descriptions. These and other objects, purposes and advantages will become apparent upon review of the following specification, drawings and claims.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

DETAILED DESCRIPTION OF THE EMBODIMENTS

In order to facilitate the understanding of the present disclosure, the present disclosure is described more comprehensively below with reference to the relevant accompanying drawings. Preferred embodiments of the present disclosure are shown in the accompanying drawings. However, the present disclosure may be implemented in many different forms and is not limited to the embodiments described herein. On the contrary, the purpose of providing these embodiments is to make the public content of the present disclosure more thoroughly and comprehensively understood.

Unless otherwise defined, all technical and scientific terms used herein have the same meanings as those commonly understood by those skilled in the technical field of the present disclosure. The terms used in the specification of the present disclosure herein are only for the purpose of describing specific embodiments, and are not intended to limit the present disclosure. As used herein, the term "and/or" includes any and all combinations of one or more related listed items.

Figure 1:
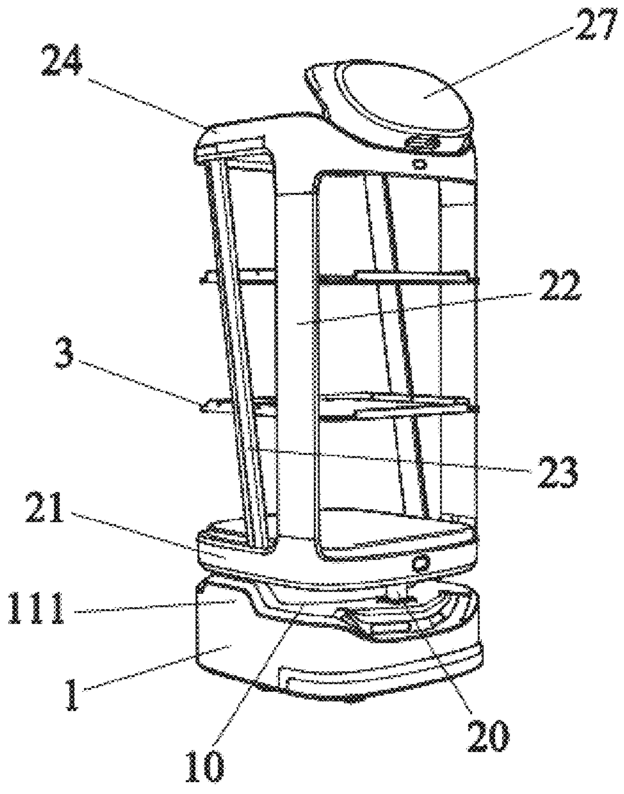
FIG. 1 is a schematic view of a delivery robot according to an embodiment of the present disclosure that omits a door plate and a side plate.
Figure 2:
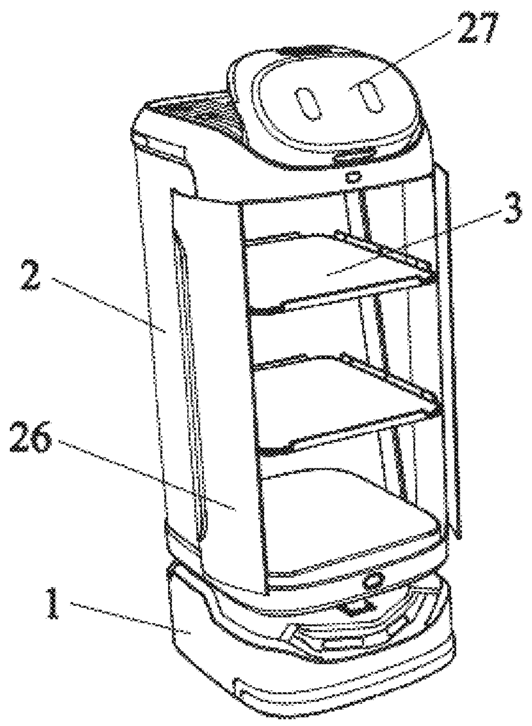
FIG. 2 is a schematic view of a delivery robot when a door plate is opened.

Referring to FIG. 1 and FIG. 2, a delivery robot is provided according to an embodiment of the present disclosure, which includes a mobile chassis 1 and a casing 2 provided on the mobile chassis 1. The mobile chassis 1 is configured to provide a driving force to drive the casing 2 to move forward or backward, so as to complete the delivery of goods, e.g., delivery of meals, delivery of documents and the like.

Figure 3:
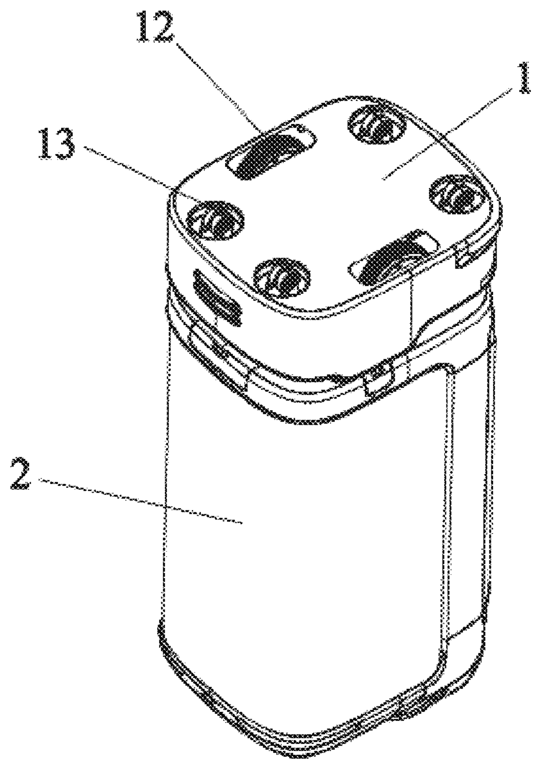
FIG. 3 is a schematic bottom view of a delivery robot.
Figure 5:
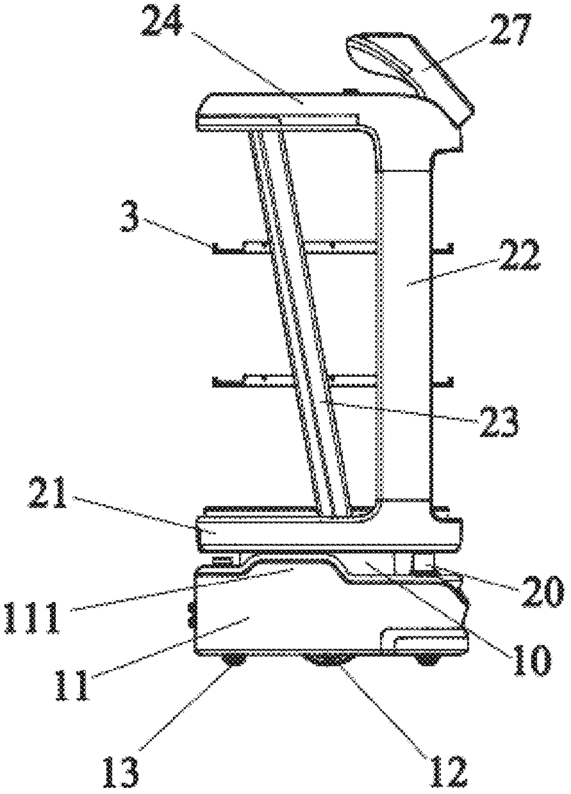
FIG. 5 is a schematic side view of FIG. 1.

Specifically, referring to FIG. 3 and FIG. 5, in this embodiment, the mobile chassis 1 includes a housing 11, a driving portion (not shown), casters 12, and universal wheels 13. The housing 11 is substantially in a shape of a cuboid, and an interior thereof is hollow, the driving portion can be placed in the housing 11. The housing 11 includes a bottom portion and a top portion. If the mobile chassis 1 is placed on the ground, a side of the mobile chassis 1 that is closest to the ground is the bottom portion, and a side opposite to the bottom portion is the top portion. The casing 2 is provided on a top portion of the housing 11, and the caster 12 is partly accommodated in the housing 11, and a bottom portion of the caster 12 is exposed from an opening 14 located at a bottom portion of the housing 11. At the same time, the driving portion is connected to the caster 12, and the driving portion provides a driving force, so as to drive the caster 12 to roll, and the rolling of the caster 12 drives the housing 11 to move forward or backward accordingly. During forward or backward movement of the housing 11, when turning is required, it can be realized by four universal wheels 13 at the bottom portion of the housing 11, and the four universal wheels 13 are respectively provided at the four corners of the bottom portion of the housing 11. When moving forward, the housing 11 is guided by the two universal wheels 13 at a front end of the housing 11, and when moving backward, the housing 11 is guided by the two universal wheels 13 at a rear end of the housing 11, thereby improving the flexibility and convenience of the movement of the delivery robot.

In addition, in the above embodiments, the front end and/or rear end of the housing 11 are provided with anti-collision strips (not shown), and the anti-collision strips are made of elastic materials (i.e., silicone), and protrude from the outer wall of the front end and/or rear end of the housing 11. When the housing 11 moves forward or backward, if the housing inevitably collides with an obstacle in front, the anti-collision strip will be in contact with and collide with the obstacle in a forward direction, so that the housing 11 will not directly collide with the obstacle. Thereby, the housing 11 can be protected and the safety of movement of the housing 11 can be improved. At the same time, it is easy to understand that in other embodiments, a circle of anti-collision strips may also be provided on an outer side of the housing 11, so that the housing 11 can be protected no matter where the collision occurs from any position, and the specific shape and material of the anti-collision strip are not limited herein.

Figure 4:
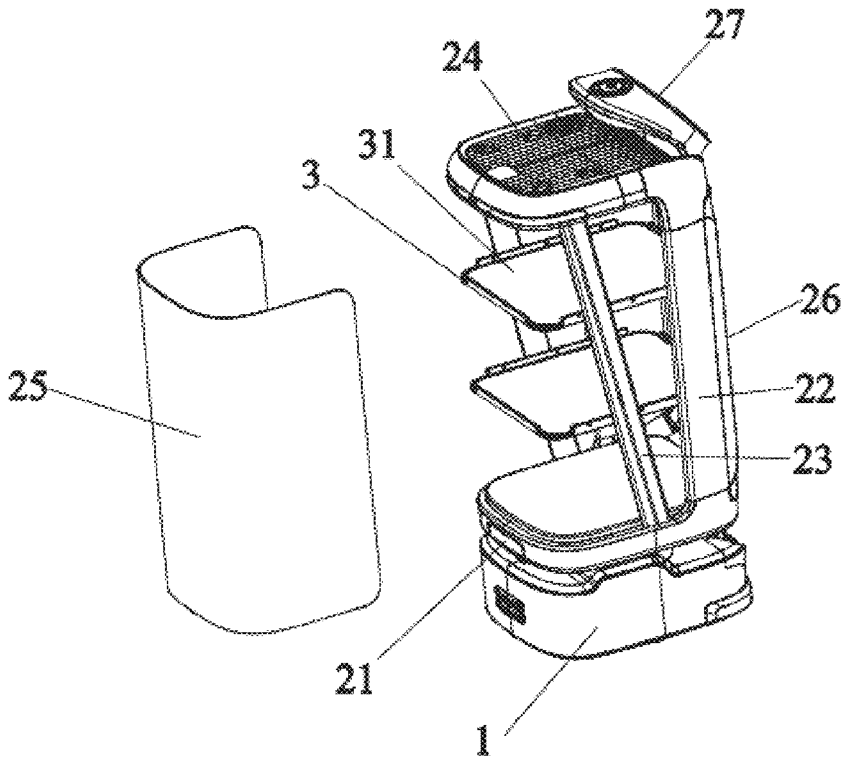
FIG. 4 is a schematic exploded view of a delivery robot.

Referring to FIGS. 4 and 5, in this embodiment, the casing 2 includes a bottom plate 21, at least two first support members 22, at least two second support members 23, a top plate 24, a side plate 25, and a door plate 26. The bottom plate 21 is substantially rectangular, and the bottom plate 21 is provided on the top portion of the housing 11. An accommodating space 10 is provided at a front end and/or a rear end between a bottom portion of the bottom plate 21 and the top portion of the housing 11. Electronic devices 20, such as a laser radar, are provided in the accommodating space 10, so as to realize the visual recognition of the robot and an interactive device to realize the human-computer interaction function, etc., so as to improve the functionality of the robot. As an optional embodiment, if the two first support members 22 can provide sufficient support force, there is no need to provide two second support members 23.

Specifically, in this embodiment, a middle area of the top portion of the housing 11 protrudes toward the bottom plate 21 to form a strip-shaped protrusion 111, and the top portion of the housing 11 is divided into two accommodating spaces 10 by the protrusion 111. A height of the portion 111 determines a height of the accommodating space 10, and the protruding height of the protrusion 111 can be determined according to different electronic devices to be mounted.

At the same time, it should be understood that in this embodiment, since the protrusion 111 protrudes from the middle area of the top portion of the housing 11, two accommodating spaces 10 are formed. If the protrusion 111 protrudes from an end (i.e., the front end or the rear end) of the top portion of the housing 11, only one accommodating space 10 will be formed, which can be adaptively selected according to actual needs.

Referring to FIG. 5, at least two first support members 22 and at least two second support members 23 are provided on a top portion of the bottom plate 21, and at least two first support members 22 are respectively located on two sides of the front end or two sides of the rear end of the bottom plate 21. The front end of the bottom plate 21 is a front side of the casing, and the rear end of the bottom plate 21 is a back side of the casing. When at least two first support members 22 are respectively located on both sides of a front end of the bottom plate 21, the delivery robot is provided with a door at the front end of the bottom plate 21. When at least two first support members 22 are respectively located on both sides of the rear end of the bottom plate 21, the delivery robot is provided with the door at the rear end of the bottom plate 21. The first support member 22 and the second support member 23 are elongated plate-shaped structures, and one first support member 22 and one second support member 23 are a group of support units. Referring to the orientation in FIG. 5, two groups of support units are supported on the left and right sides of the top portion of the bottom plate 21, respectively, and two groups of support units are used to provide the mounting foundation for the top plate 24. At the same time, the first support member 22 can be used to facilitate the mounting of the door plate 26, and the second support member 23 can be used to facilitate the mounting of the side plate 25. Certainly, for some occasions that do not require high privacy, it is also possible to directly adopt the no-door design without mounting the door plate.

In this embodiment, the first support member 22 and the second support member 23 form an angle with a preset degree. That is, the first support member 22 is provided in a vertical direction, the second support member 23 is provided in an oblique direction, and a top end of the second support member 23 is away from the first support member 22, and a bottom end of the second support member 23 is adjacent to the first support 22. That is, with respect to the first support member 22 and the second support member 23, a distance between the top portions of the two is greater than a distance between the bottom portions of the two, so that the first support member 22, the second support member 23 and the top plate 24 form a stable triangular structure, which is beneficial to improve the stability of the connection. It should be understood that, in other embodiments, the first support member 22 can be provided in a vertical direction, the second support member 23 can be provided in an oblique direction, and the top end of the second support member 23 is adjacent to the first support member 22, the bottom end of the second support member 23 is away from the first support member 22. That is, with respect to the first support member 22 and the second support member 23, the distance between the top portions of the two is less than the distance between the bottom portions of the two. It should be understood that, in other embodiments, the first support member 22 and the second support member 23 may also be parallel to each other, which may be adaptively selected according to actual needs.

Referring to FIG. 5, the top plate 24 is substantially rectangular, and at the same time, a top surface of the top plate 24 away from the first support member 22 is an inclined arc surface. A display device 27 is provided on the top surface of the top plate 24. The display device 27 is electrically connected to the electronic device to display images. For example, when the electronic device is a visual recognition device, the display device 27 can be a display screen, which can display a forward route identified by the visual recognition device through the display screen. Alternatively, when the electronic device is an interactive device, the display device 27 may be a touch display screen for human-computer interaction.

Referring to FIG. 4, the side plate 25 is a substantially U-shaped curved plate, and the side plate 25 is enclosed between the top plate 24 and the bottom plate 21 to form the casing without the door plate 26. Referring to FIG. 2, the door plate 26 is provided at a front opening of the casing 2, and the door plate 26 is rotatably provided on the first support member 22. It should be understood that the rotatable connection is only one of the flexible connections. In other embodiments, the door plate 26 may also be designed to be slidably connected. That is, the door plate 26 is opened by sliding to both sides, and the specific connection structure is not limited herein. Two door plates 26 are provided, and the two door plates 26 are opened by opening to both sides. Preferably, the door plate 26 is an automatic induction door plate. When the goods are delivered in place, the door plate 26 can receive a control signal to automatically open to improve the convenience of the robot. Certainly, in other embodiments, the door plate 26 may also be provided with an opening mode of manual opening. At the same time, it is not limited to the opening mode of opening to both sides through two door plates 26, and may also be provided with a structural form of one door plate or a plurality of door plates, which can be adaptively selected as needed.

Further, as shown in FIG. 4, a plurality of layers of trays 3 are provided in parallel in a vertical direction in the casing 2. The plurality of layers of tray 3 are configured to place goods, and a layer height between the trays 3 can be flexibly designed according to the actual situation. The top portion of the tray 3 is provided with an anti-slip layer 31. Specifically, the anti-slip layer 31 may be made of an anti-slip material, and the anti-slip effect can be realized by being laid on a plane of the top portion of the tray 3. Structures such as bumps or patterns may also be provided directly in the plane of the top portion of the tray 3 to increase the surface friction coefficient of the plane of the top portion of the tray 3, thereby increasing the friction between the goods and the plane of the top portion of the tray 3, thereby increasing the friction between the goods and the top plane of the tray 3, thereby achieving an anti-slip effect. Therefore, the anti-slip layer 31 can prevent the goods from sliding relative to the tray 3 and improve the stability of the delivery of the goods.

In summary, the delivery robot provided by the embodiment of the present disclosure can facilitate the mounting of the door plate 26 and the side plate 25 through the structural design of the first support member 22 and the second support member 23, and the overall structural strength and support stability of the casing 2 can be improved. At the same time, the electronic device 20 provided in the accommodating space 10 can achieve the effects of human-computer interaction and displaying images, and improve the use effect of the robot.

Figure 6:
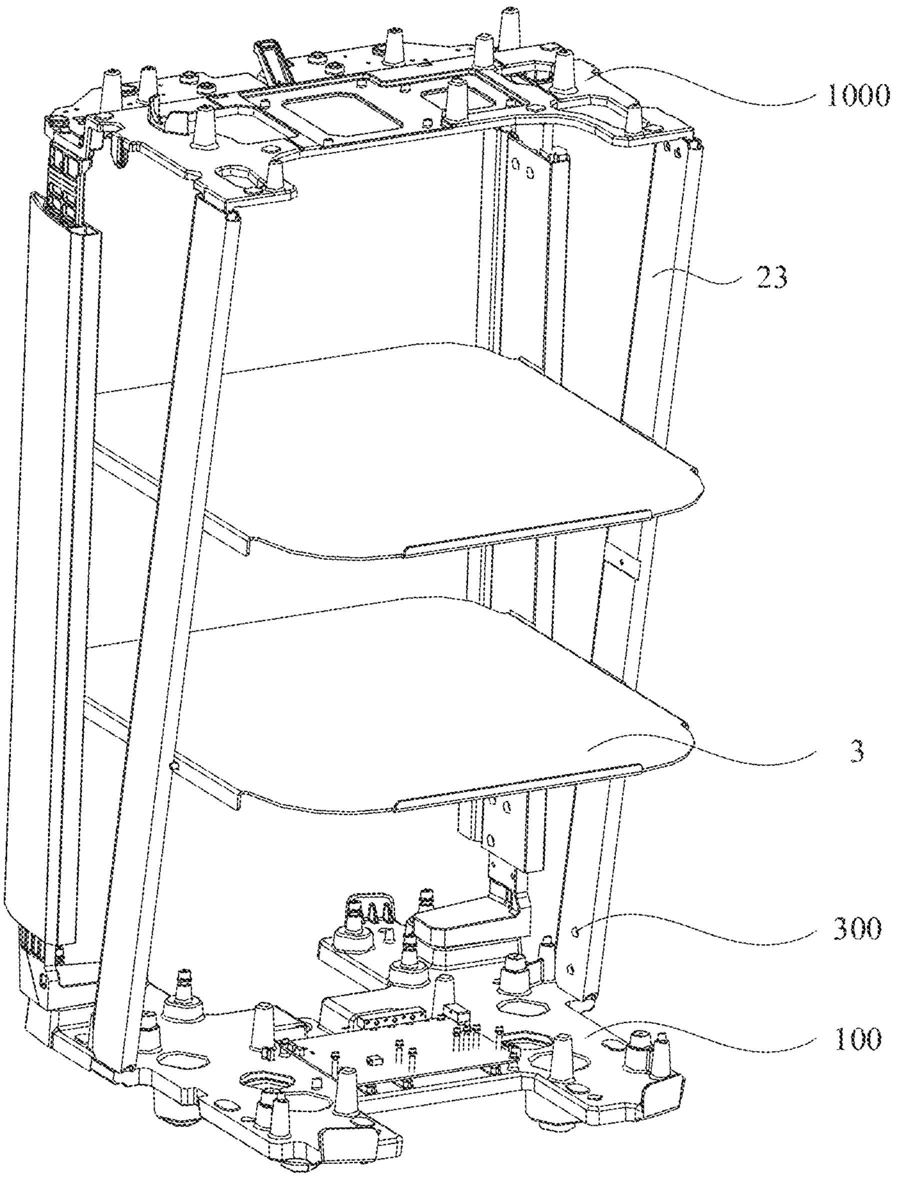
FIG. 6 is a schematic view of a delivery robot according to an embodiment.
Figure 7:
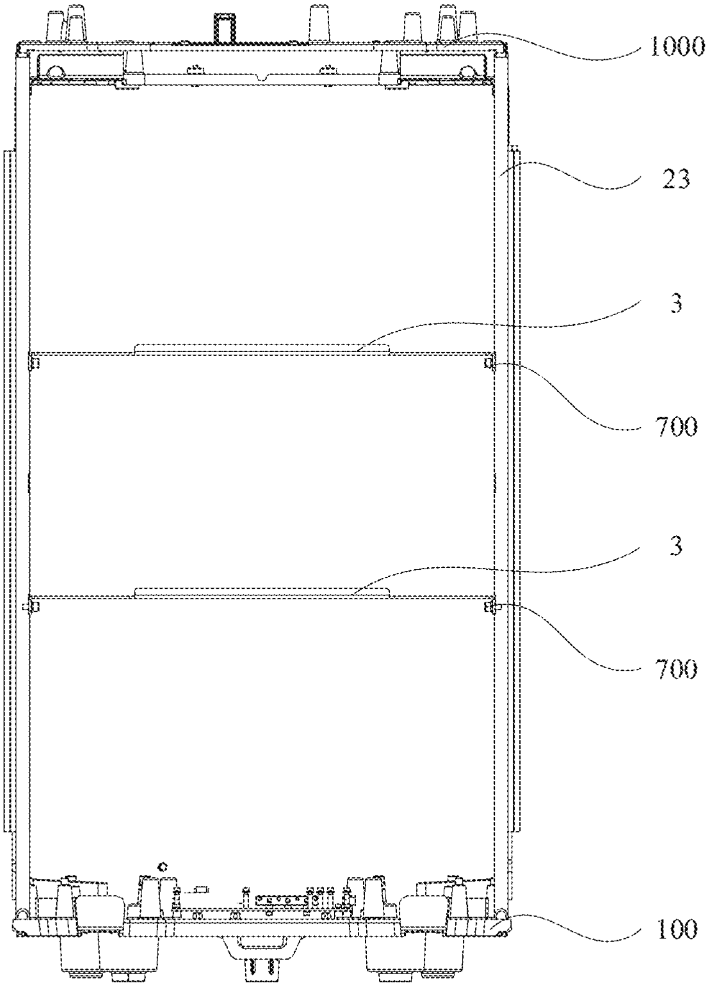
FIG. 7 is a schematic view of FIG. 6 viewed from another aspect.

As shown in FIG. 6 and FIG. 7, in an embodiment, a delivery robot is provided, including a bottom fixing member 100. The bottom fixing member 100 is configured to be fixedly connected to the mobile chassis 1, and the casing 2 is fixedly connected to the bottom fixing member 100.

According to the delivery robot in the above embodiment, the casing 2 is fixed on the bottom fixing member 100, and the bottom fixing member 100 is fixedly connected to the mobile chassis 1. The casing 2 is prevented from being directly fixed on the mobile chassis 1 to increase the bearing load of the mobile chassis 1, thereby improving the overall reliability and stability of the delivery robot.

In an embodiment, the second support member 23 is fixedly connected to the bottom fixing member 100.

The second support member 23 may be a structure such as a support rod or a support post. The bottom fixing member 100 may be a structure such as a fixing base or a fixing plate. The bottom fixing member 100 can be formed by assembling a plurality of components, or can be formed by integral molding, as long as the bottom fixing member 100 can be fixedly connected to the second support member 23.

Optionally, the bottom fixing member 100 is integrally formed. In this way, the geometric dimension accuracy of the bottom fixing member 100 is increased, thereby enabling the delivery robot to be more stable.

The second support member 23 is fixedly connected to the bottom fixing member 100, either through a detachable connection such as snap-fitting, inserting or screwing, or through a non-detachable connection such as welding or riveting, as long as the second support member 23 can be fixedly connected to the bottom fixing member 100.

Figure 8:
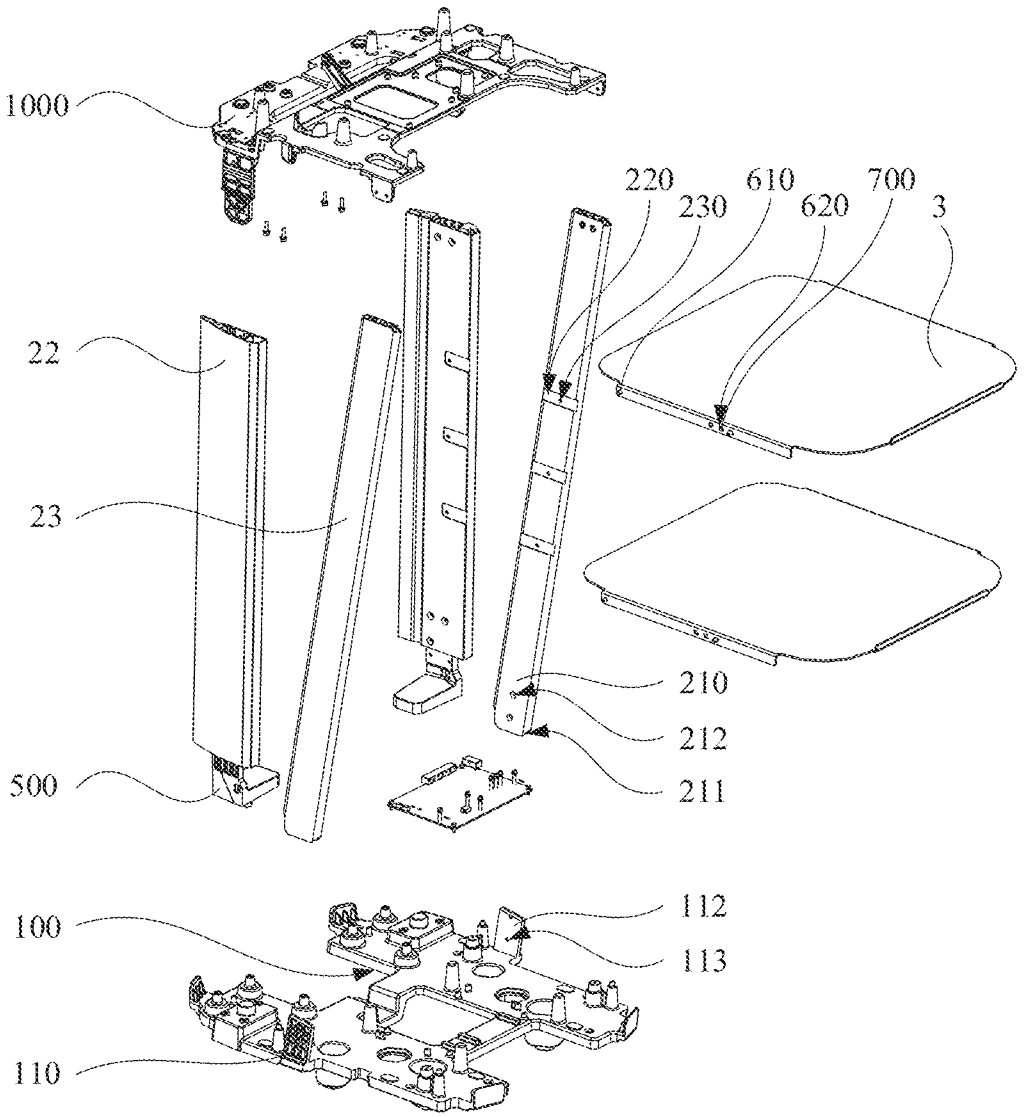
FIG. 8 is an exploded view of FIG. 6.

As shown in FIG. 8, in an embodiment, the bottom fixing member 100 is provided with a first connecting portion 110. An end of the second support member 23 adjacent to the bottom fixing member 100 is provided with a second connecting portion 210. The first connection member 110 is fixedly connected to the second connection member 210. In this way, the convenience of the fixed connection between the bottom fixing member 100 and the second support member 23 is improved through the fixed connection between the first connecting member 110 and the second connecting member 210.

As shown in FIG. 8, further, the second connecting portion 210 is provided with an inserting slot 211. The first connecting portion 110 includes an inserting block 112 that is inserted into the inserting slot 211. In this way, the first connection member 110 and the second connection member 210 can be inserted and fixed quickly by inserting the inserting block 112 to the inserting slot 211, which improves the assembly efficiency of the delivery robot.

As shown in FIG. 8, in an embodiment, the delivery robot further includes a first auxiliary fixing member 300. The second connecting portion 210 is provided with an inserting slot 211. An inner wall of the inserting slot 211 is provided with a first through hole 212. The inserting block 112 is provided with a second through hole 113 in communication with the first through hole 212. The first auxiliary fixing member 300 is configured to auxiliary fix the inner wall of the inserting slot 211 to the inserting block 112 through the first through hole 212 and the second through hole 113. In this way, firstly, the first connection member 110 and the second connection member 210 are preliminarily fixed through the insert-in fit between the inserting block 112 and the inserting slot 211, and the first through hole 212 is in communication with the second through hole 113 correspondingly, so as to improve the assembly accuracy of the bottom fixing member 100 and the second support member 23. Then, the first auxiliary fixing member 300 auxiliary fixes the inner wall of the inserting slot 211 to the inserting block 112 through the first through hole 212 and the second through hole 113, so that the strength of the fixed connection between the first connecting member 110 and the second connecting member 210 is increased, so that during the use of the delivery robot, the second support member 23 will not move relative to the bottom fixing member 100, thereby improving the stability and reliability of the delivery robot.

The first auxiliary fixing member 300 may be a structure such as an engaging block, a screw or a bolt, as long as the first auxiliary fixing member 300 can auxiliary fix the bottom fixing member 100 to the second support member 23.

Optionally, the first through hole 212 and/or the second through hole 113 are configured as threaded holes. In this way, the stability and reliability of the fixed connection between the first connection member 110 and the second connection member 210 are further improved through the threaded fit between the screw and the threaded hole.

The number of the second support members 23 can be flexibly adjusted according to actual use requirements, for example, the number of the second support members 23 may be one, two, three or four, and so on. The second support member 23 may be fixed on a side of the bottom fixing member 100 or spaced apart from the side of the bottom fixing member 100, as long as the second support member 23 is fixedly connected to the bottom fixing member 100.

In an embodiment, at least two second support members 23 are provided. At least two second support members 23 are correspondingly provided on the same side of the bottom fixing member 100. In this way, by increasing the number of the second support members 23, the number of support surfaces between the second support members 23 and the tray 3 is increased, thereby improving the stability and reliability of the support of the second support member 23 to the tray 3. In addition, at least two second support members 23 are correspondingly provided on the same side of the bottom fixing member 100, thereby facilitating the mounting of the tray 3 and taking and placing goods on the tray 3.

Optionally, at least two second support members 23 are provided. At least two second support members 23 are correspondingly provided on adjacent two sides of the bottom fixing member 100. In this way, by increasing the number of the second support members 23, the number of support surfaces between the second support members 23 and the tray 3 is increased, thereby improving the stability and reliability of the support of the second support members 23 to the tray 3. In addition, at least two second support members 23 are correspondingly provided on the adjacent two sides of the bottom fixing member 100, so that at least two second support members 23 can support different positions of the tray 3, thereby improving the stability and reliability of the support of second support member 23 to the tray 3.

Optionally, at least two second support members 23 are provided. At least two second support members 23 are correspondingly provided on opposite sides of the bottom fixing member 100. In this way, by increasing the number of the second support members 23, the number of support surfaces between the second support members 23 and the tray 3 is increased, thereby improving the stability and reliability of the support of the second support members 23 to the tray 3. In addition, at least two second support members 23 are correspondingly provided on opposite sides of the bottom fixing member 100, so that the tray 3 is conveniently provided directly above the bottom fixing member 100, thereby reducing the volume of the delivery robot.

In an embodiment, the delivery robot includes a bottom fixing member 100, a second auxiliary fixing member (not shown), a third auxiliary fixing member (not shown), a first support member 22, and a connecting member 500. The first support member 22 is spaced apart from the bottom fixing member 100. The connecting member 500 is fixed between the bottom fixing member 100 and the first support member 22. The second auxiliary fixing member is configured to auxiliary fix the bottom fixing member 100 to the connecting member 500. The third auxiliary fixing member is configured to auxiliary fix the first support member 22 to the connecting member 500. In this way, the connecting member 500 is fixed between the bottom fixing member 100 and the first support member 22, and the second auxiliary fixing member and the third auxiliary fixing member perform auxiliary fixing correspondingly, thereby reducing the length of the first support member 22 along its own length direction (as shown in the direction A in FIG. 8), thereby reducing the processing difficulty of the delivery robot.

As shown in FIG. 8, in an embodiment, the delivery robot includes a bottom fixing member 100, a first auxiliary fixing member 300, a second auxiliary fixing member (not shown), a third auxiliary fixing member (not shown), a first support member 22, a second support member 23, and a connecting member 500. The second support member 23 is fixedly connected to the bottom fixing member 100. The first auxiliary fixing member 300 is configured to auxiliary fix the bottom fixing member 100 to the second support member 23. The first support member 22 is spaced apart from the bottom fixing member 100. The connecting member 500 is fixed between the bottom fixing member 100 and the first support member 22. The second auxiliary fixing member is configured to auxiliary fix the bottom fixing member 100 to the connecting member 500. The third auxiliary fixing member is configured to auxiliary fix the first support member 22 to the connecting member 500. In this way, through the fixed connection between the second support member 23 and the bottom fixing member 100, and by fixing the connecting member 500 between the bottom fixing member 100 and the first support member 22, the second support member 23 can be directly fixed on the bottom fixing member 100, thereby ensuring the reliability and stability of the support of the first support member 22, and the second supporting part 40 can be indirectly fixed on the bottom fixing member 100 through the connecting member 500, thereby facilitating the processing of the first support member 22, thus reducing the processing difficulty of the delivery robot on the basis of ensuring the reliability and stability of the delivery robot.

Both the second auxiliary fixing member and the third auxiliary fixing member can be structures such as engaging blocks, screws or bolts, as long as they can auxiliary fix the bottom fixing member 100 to the connecting member 500, and auxiliary fix the second support member 23 to the connecting member 500.

The first support member 22 may be a structure such as a support rod or a support post. The connecting member 500 may be a structure such as a connecting rod or a connecting frame, as long as the connecting member 500 can be fixed between the bottom fixing member 100 and the first support member 22.

As shown in FIG. 8, in an embodiment, the delivery robot further includes a tray 3 provided with an engaging block 610. An outer wall of the second support member 23 is provided with an engaging slot 220. The engaging block 610 is engaged in the engaging slot 220. In this way, the tray 3 can support the goods stably and reliably through the snap-fitting between the engaging block 610 and the engaging slot 220.

The tray 3 may be a support tray, a support plate or a support hook and other structures. The number of trays 3 can be flexibly adjusted according to actual needs, for example, one, two or three trays 3 may be provided. In other embodiments, the tray 3 can also be fixedly provided on the second support member 23 by screwing, snap-fitting or inserting, etc., as long as the tray 3 can support the goods.

Optionally, at least two trays 3 and at least two engaging slots 220 are provided. At least two trays 3 are provided with engaging blocks 610. At least two engaging slots 220 are spaced apart along a length direction of the second support member 23. At least two engaging blocks 610 are provided in one-to-one correspondence with at least two engaging slots 220. In this way, by providing at least two trays 3, the number of carrying surfaces is increased, thereby improving the carrying capacity of the delivery robot.

As shown in FIG. 8, further, the engaging block 610 is provided with a third through hole 620. An inner wall of the engaging slot 220 is provided with a fourth through hole 230 that is in communication with the third through hole 620. The delivery robot also includes a fourth auxiliary fixing member 700. The fourth auxiliary fixing member 700 is configured to auxiliary fix the engaging block 610 to the inner wall of the engaging slot 220 through the third through hole 620 and the fourth through hole 230. In this way, firstly, the tray 3 and the second support member 23 are preliminarily fixed through the snap-fitting between the engaging block 610 and the engaging slot 220, and the third through hole 620 is in communication with the fourth through hole 230 correspondingly, so as to improve the assembly accuracy of the tray 3 and the second support member 23. Then, the fourth auxiliary fixing member 700 auxiliary fixes the engaging block 610 to the inner wall of the engaging slot 220 through the third through hole 620 and the fourth through hole 230, so that the strength of the fixed connection between the tray 3 and the second support member 23 is increased, so that during the use of the delivery robot, the tray 3 will not move relative to the second support member 23, thereby improving the stability and reliability of the delivery robot.

The fourth auxiliary fixing member 700 may be a structure such as an engaging block, a screw or a bolt, as long as the fourth auxiliary fixing member 700 can auxiliary fix the engaging block 610 to the inner wall of the engaging slot 220.

Figure 9:
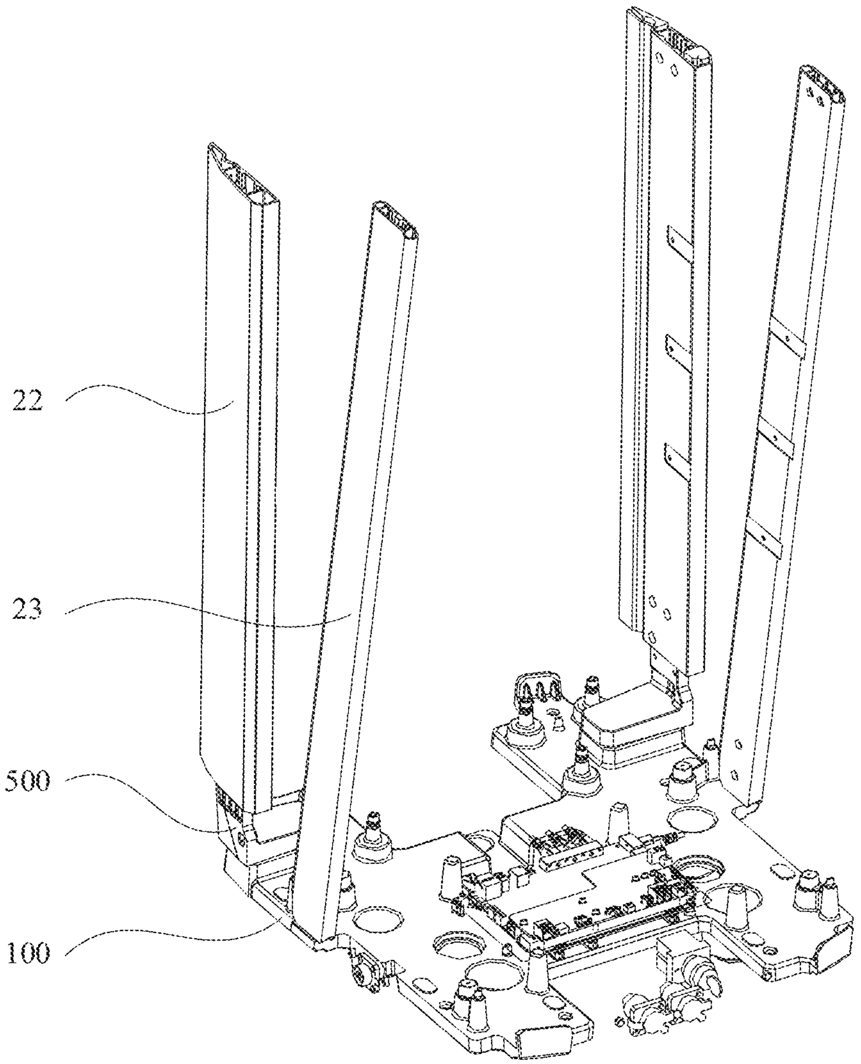
FIG. 9 is a schematic view of a delivery robot according to another embodiment.
Figure 10:
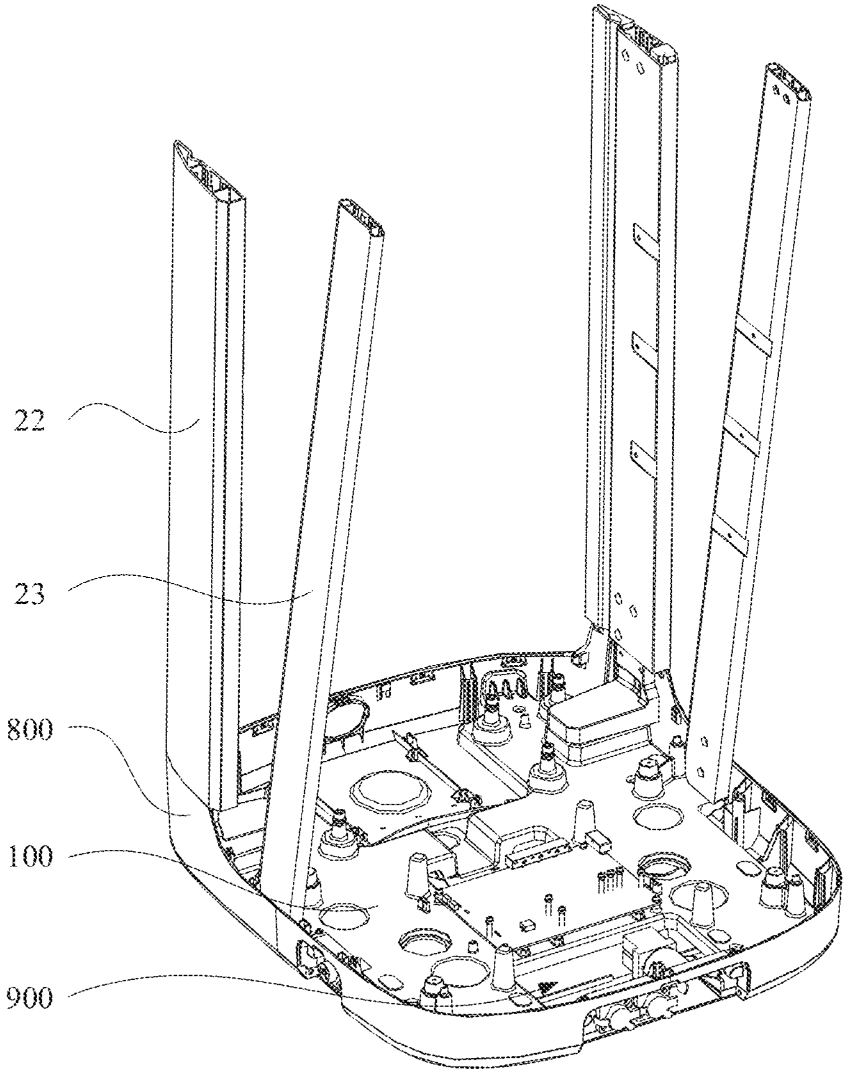
FIG. 10 is a schematic view of a delivery robot according to yet another embodiment.
Figure 11:
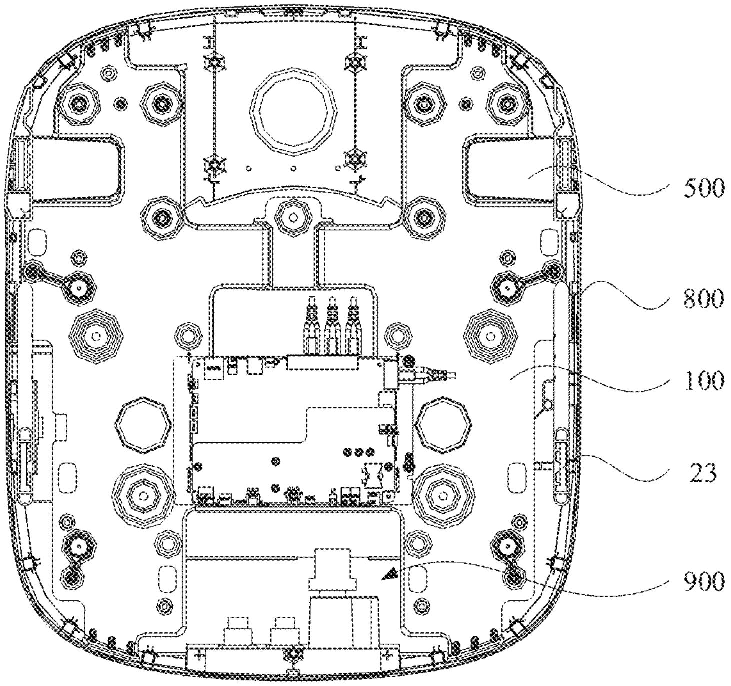
FIG. 11 is a schematic view of FIG. 10 viewed from another aspect.

As shown in FIGS. 9 to 11, in an embodiment, the delivery robot further includes a shell 800. A side wall of the bottom fixing member 100 is provided with a wire passing groove, and the shell 800 cooperates with the inner wall of the wire passing groove to form a wire passing hole 900. In this way, the shell 800 cooperates with the inner wall of the wire passing groove to form the wire passing hole 900, so that the wires of the delivery robot can enter an interior of the delivery robot through the wire passing hole 900, thereby improving the convenience of distributing the wires of the delivery robot. At the same time, the wires of the delivery robot can be arranged through the wire passing hole 900, so as to prevent the wires from being entangled, thereby facilitating the repair or maintenance of the delivery robot. In addition, the shell 800 is provided on the outside of the bottom fixing member 100, which can improve the aesthetics of the delivery robot.

The shell 800 surrounds the outside of the bottom fixing member 100, and can be fixedly connected by snap-fitting, inserting, screwing or other methods. The number of wire passing holes 900 can be flexibly provided or adjusted according to actual conditions, for example, one, two or four wire passing holes 900 may be provided.

Figure 12:
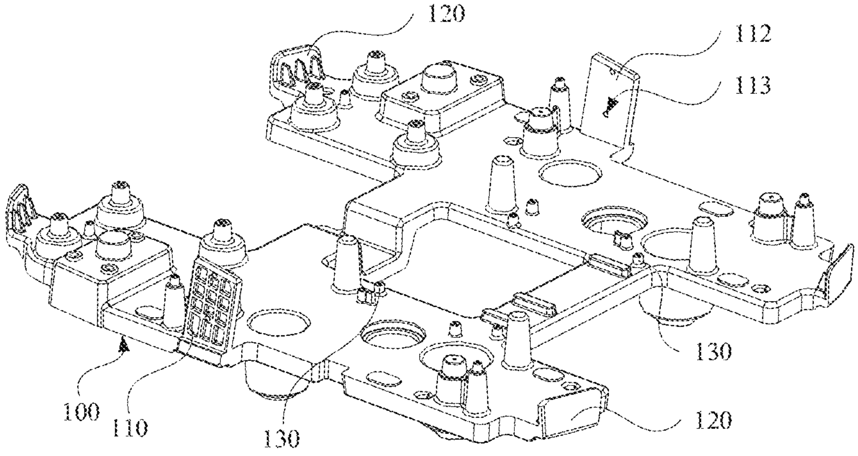
FIG. 12 is a schematic view of a bottom fixing member of FIG. 6.

As shown in FIG. 12, in an embodiment, the bottom fixing member 100 is further provided with a support portion 120 for supporting the shell 800. In this way, the shell 800 is supported by the supporting portion 120, which improves the deformation resistance of the shell 800.

The support portion 120 may be a support plate, a support block, a support post or other support structures. The number of supporting portions 120 can be flexibly provided or adjusted according to actual conditions, for example, two, four or six supporting portions 120 are provided.

The bottom fixing member 100 is provided with the first connecting member 110, the supporting portion 120 and a fixing portion 130, which can be modularly assembled on the bottom fixing member 100 or integrally formed with the bottom fixing member 100.

In an embodiment, the first connecting member 110, the supporting portion 120 and the fixing portion 130 are integrally formed with the bottom fixing member 100. In this way, the geometric dimension accuracy of the bottom fixing member 100 is higher, thereby enabling the delivery robot to be more stable.

As shown in FIG. 12, in an embodiment, the bottom fixing member 100 is further provided with a fixing portion 130 configured to fix the housing 11. In this way, the housing 11 is fixed by the fixing portion 130, which improves the convenience and reliability of mounting the housing 11.

The fixing portion 130 may be a fixing block, a fixing buckle, a fixing post or other fixing structures. The number of fixing portions 130 can be flexibly provided or adjusted according to actual conditions, for example, two, four or six fixing portions 130 may be provided.

As shown in FIGS. 6 to 8, in an embodiment, the delivery robot further includes a top fixing member 1000 spaced apart from the bottom fixing member 100. The second support member 23 is fixed between the bottom fixing member 100 and the top fixing member 1000. In this way, the bottom fixing member 100, the second support member 23, and the top fixing member 1000 can cooperate to form a stable structure, thereby improving the stability of the delivery robot, thereby improving the overall reliability and stability of the delivery robot.

The top fixing member 1000 may be a structure such as a fixing base or a fixing plate. The top fixing member 1000 can be formed by assembling a plurality of components, or can be formed by integral molding, as long as the second support member 23 is fixed between the bottom fixing member 100 and the top fixing member 1000.

Optionally, the top fixing member 1000 is integrally formed. In this way, the geometric dimension accuracy of the top fixing member 1000 is increased, thereby enabling the delivery robot to be more stable.

The first support member 22 is fixed between the bottom fixing member 100 and the top fixing member 1000, either through a detachable connection such as snap-fitting, inserting or screwing, or through a non-detachable connection such as welding or riveting, as long as the second support member 23 can be fixed between the bottom fixing member 100 and the top fixing member 1000.

As shown in FIGS. 6 and 7, in an embodiment, the delivery robot includes a bottom fixing member 100, a second support member 23, and a first auxiliary fixing member 300. The second support member 23 is fixedly connected to the bottom fixing member 100. The first auxiliary fixing member 300 is configured to auxiliary fix the bottom fixing member 100 to the second support member 23. In this way, when the body structure is in use, firstly, a position of the second support member 23 relative to the bottom fixing member 100 is adjusted, and the second support member 23 is fixed on the bottom fixing member 100 to perform preliminary fixing. Then, after adjusting or confirming the position of the second support member 23 relative to the bottom fixing member 100 again, the bottom fixing member 100 and the second support member 23 are auxiliary fixed by the first auxiliary fixing member 300, so that the strength of the fixed connection between the bottom fixing member 100 and the second support member 23 is increased, and the second support member 23 will not move relative to the bottom fixing member 100 during the use of the delivery robot, thereby improving the overall reliability and stability of the delivery robot. In addition, the present disclosure uses the fixed connection between the second support member 23 and the bottom fixing 100 for preliminary fixing, so that the position of the second support member 23 relative to the bottom fixing 100 can be adjusted during the assembly process of the delivery robot, thereby improving the assembly accuracy of the delivery robot is improved, and improving the overall reliability and stability of the delivery robot.

Figure 13:
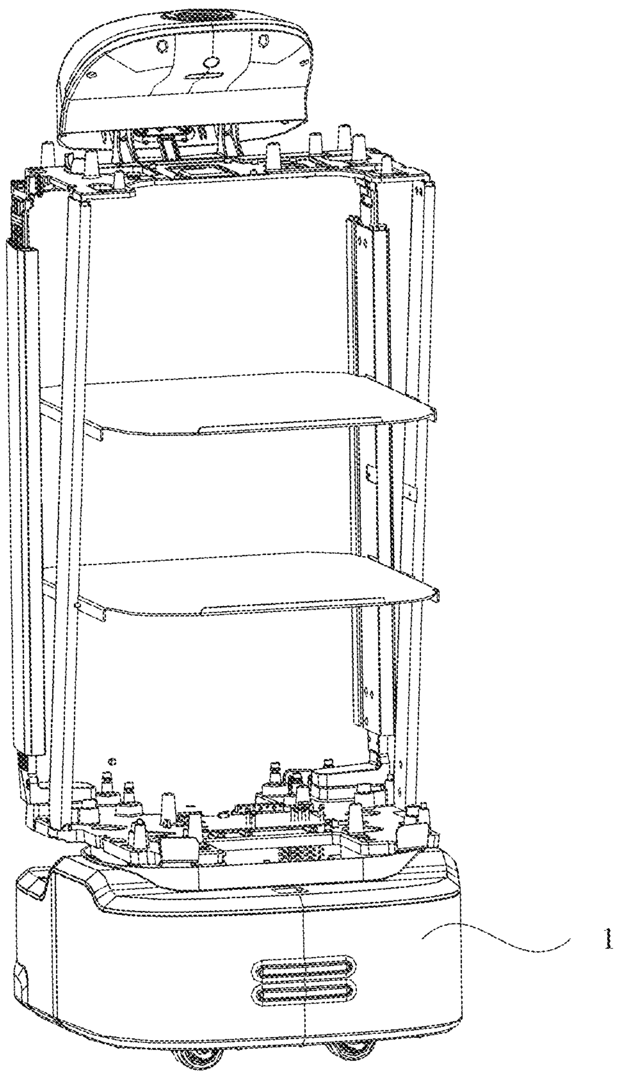
FIG. 13 is a schematic view of a delivery robot according to an embodiment.

As shown in FIG. 6 and FIG. 13, in an embodiment, a delivery robot is provided, including the mobile chassis 1. The bottom fixing member 100 is fixed on the mobile chassis 1, and the bottom fixing member 100 is located between the mobile chassis 1 and the casing 2. In the delivery robot of the above embodiment, the casing 2 is fixed on the bottom fixing member 100, and the bottom fixing member 100 is fixedly connected to the mobile chassis 1. The casing 2 is prevented from being directly fixed on the mobile chassis 1 to increase the bearing load of the mobile chassis 1, thereby improving the overall reliability and stability of the delivery robot.

As shown in FIGS. 14 to 17, in a delivery robot provided by an embodiment of the present disclosure, the casing 2 is provided with an accommodating space 28 having an opening 213. The door plate 26 is configured to form a closed cavity to package the goods to be delivered with the accommodating space 28 when the door plate 26 covers the opening 213. The casing 2 includes an enclosure assembly 249 and two first support members 22. The two first support members 22 are located on opposite sides of the opening 213, both of the enclosure assembly 249 and the door plate 26 are mounted on the two first support members 22, and the accommodating space 28 is enclosed by the enclosure assembly 249 and the two first support members 22.

Figure 17:
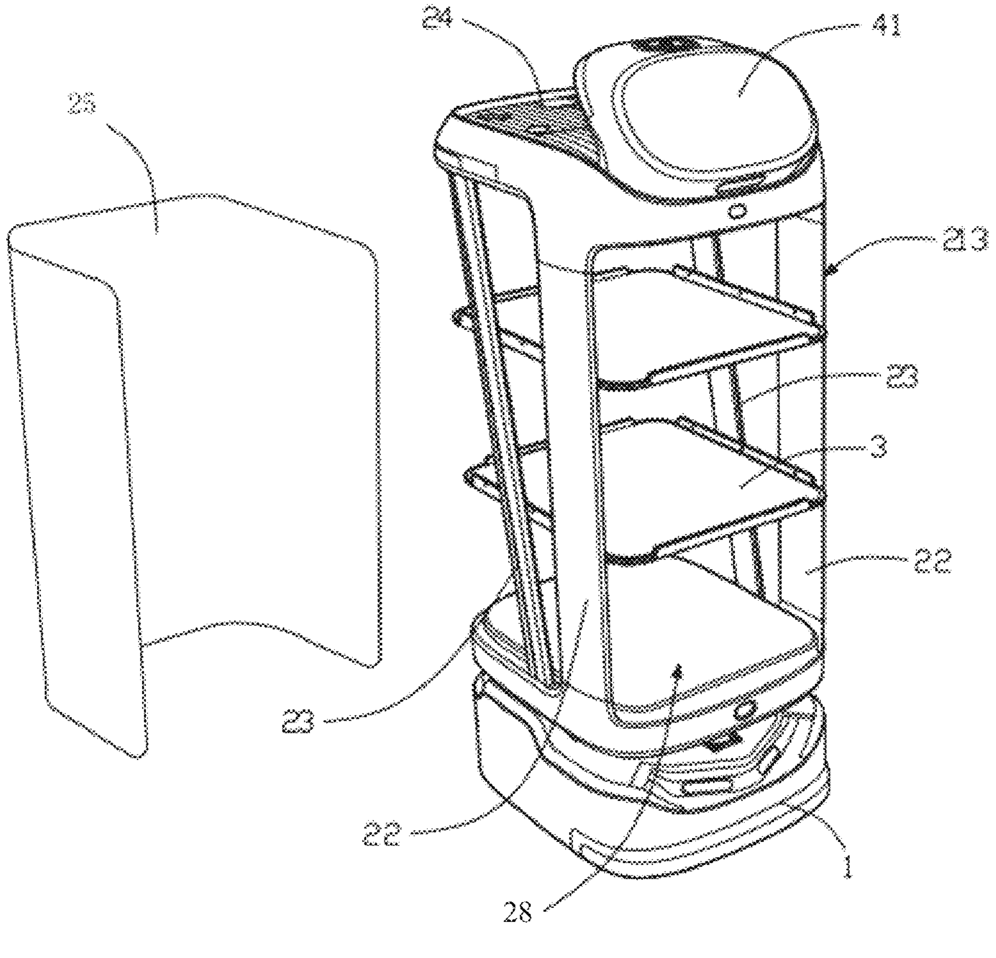
FIG. 17 is a schematic partial view of a delivery robot according to an embodiment.

In this embodiment, the enclosure assembly 249 of the casing 2 and the two first support members 22 cooperatively form the accommodating space 28, and the two first support members 22 are located on opposite sides of the opening 213. As shown in FIG. 17, the side edges of the two first support members 22 adjacent to the opening 213 are part of the edge of the opening 213, so that after the door plate 26 are mounted on the two first support members 22, the opening 213 can be covered by the door plate 26.

The mobile chassis 1 is provided with a driving wheel group configured to drive the delivery robot to move. The driving wheel group may include one or more driving wheels, and may further include one or more universal wheels. In the present disclosure, the number and arrangement of the driving wheels and universal wheels can be adjusted as required, as long as the purpose of driving the delivery robot to move and rotate can be achieved. The way in which the casing 2 is mounted on the mobile chassis 1 can be adjusted as required. For example, the casing 2 can be fixed or detachably mounted on the mobile chassis 1 through buckles, screws or other connecting members, as long as the stable connection between the two can be achieved. It should be understood that the shape of the casing 2 can be set as required, for example, it may be a rectangle-like shape (that is, a cuboid as a whole, but smooth arc surfaces is provided at the corners of the cuboid), a cylinder or a cylinder-like shape, etc. It should be understood that most of outer surfaces of the above-mentioned rectangular-like, cylindrical, or cylindrical-like casing 2 are designed with curved surfaces, so that not only the appearance is improved, but also when it is in contact with external objects or people, no harm will be caused to them.

Figure 14:
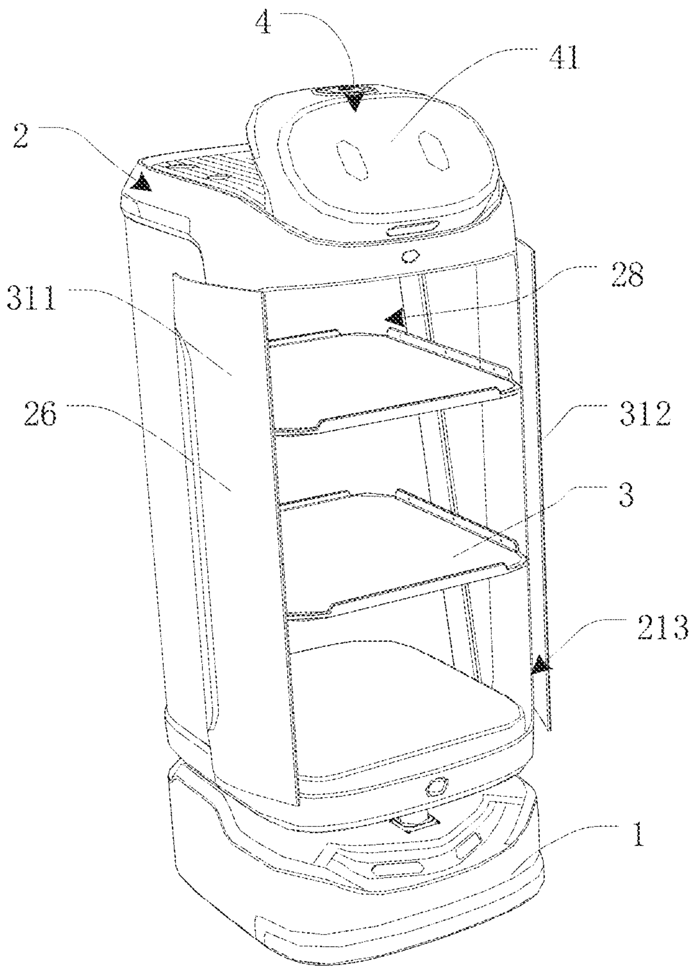
FIG. 14 is a schematic view of a delivery robot according to an embodiment when a door plate is opened.
Figure 15:
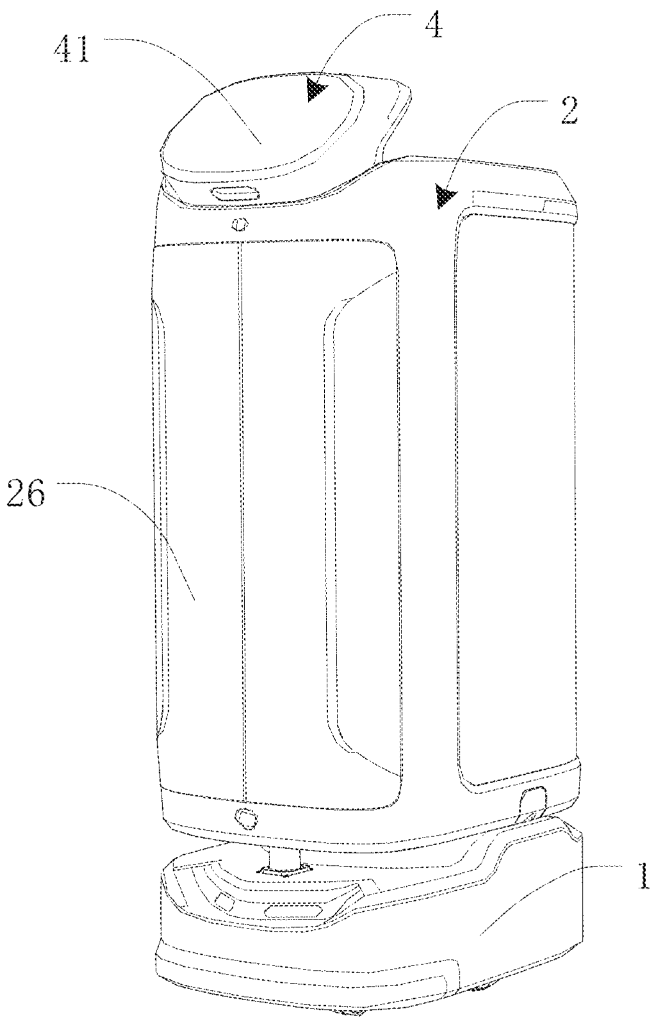
FIG. 15 is a schematic view of a delivery robot when a door plate is closed.
Figure 16:
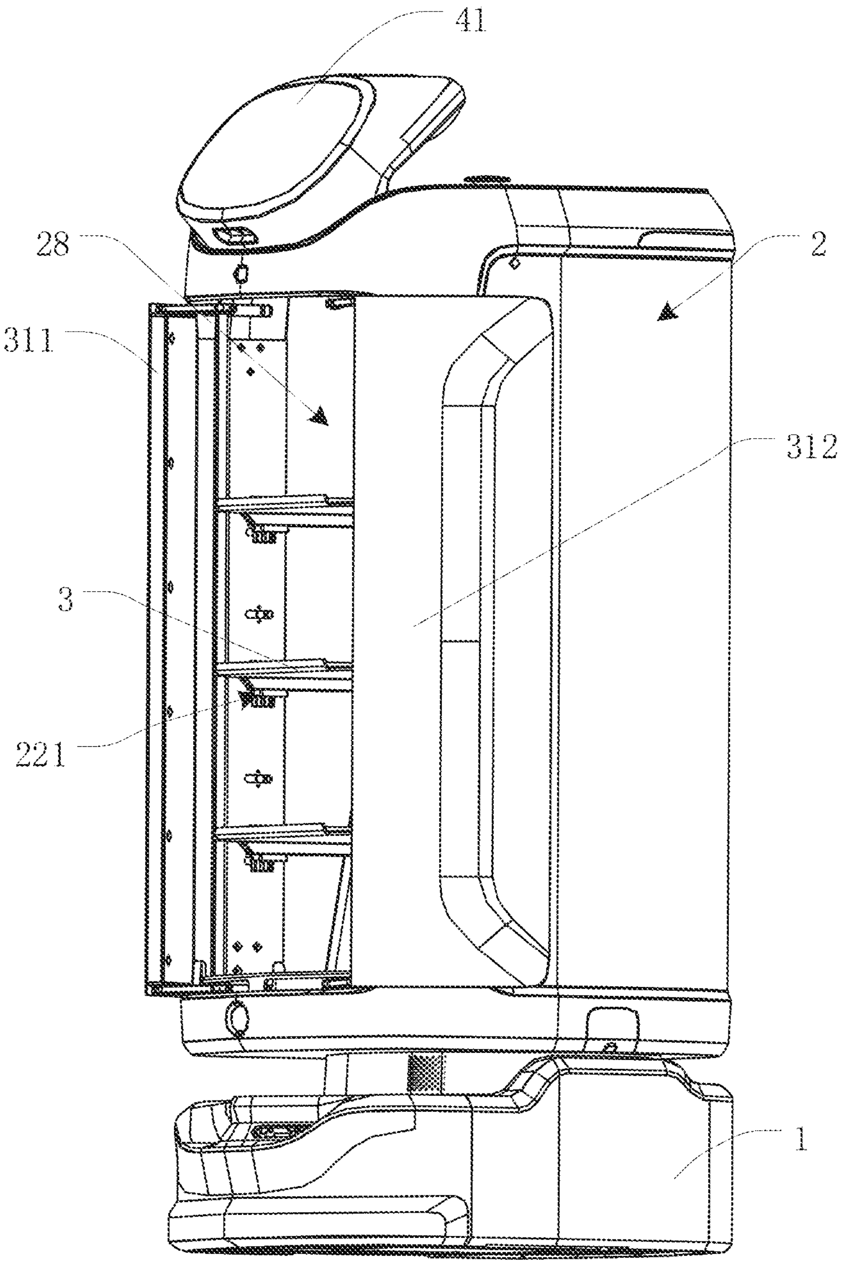
FIG. 16 is a schematic view of a delivery robot according to another embodiment when the door plate is opened.

It should be understood that the shape of the accommodating space 28 can be set as required. The accommodating space 28 in FIG. 14 is square, but it may also be circular, oval, etc. other than square. The position of the opening 213 can be set as required. For example, when the casing 2 and the accommodating space 28 are both rectangular-like as shown in FIGS. 14 to 16, the opening 213 may be provided on a side of the accommodating space 28 (e.g., a front side F1, a rear side, a first side F2, or a second side F3 of the accommodating space 28 are all available, the front side F1 is opposite to the rear side, and the first side F2 is opposite to the second side F3, and the first side F2 and the second side F3 are provided on opposite sides of the front side F1 and the rear side, respectively), and the shape of the opening 213 can also be set as a rectangle similar to the shape of the side of the accommodating space 28, so that the opening 213 is as large as possible, to facilitate picking and placing objects. It should be understood that the opening 213 may also be set on a top portion of the accommodating space 28 (that is, a top surface of the casing 2). At this time, the goods to be delivered can be taken and placed from the opening 213 located on the top portion. It should be understood that when the door plate 26 covers the opening 213, the door plate 26 and the accommodating space 28 cooperatively form the closed cavity for containing the goods to be delivered, so as to ensure the hygiene and safety of the goods to be delivered. When the door plate 26 no longer covers the opening 213, that is, the closed cavity is opened and no longer in a closed state, the goods to be delivered can be taken out or placed in the accommodating space 28. Therefore, the door plate 26 with the function of automatically opening and closing the opening 213 is provided, which can ensure that the delivery goods (such as food, etc.) can be delivered to the required place accurately, safely and hygienically.

In the above-mentioned embodiments of the present disclosure, the enclosure assembly 249 of the casing 2 and the two first support members 22 cooperatively form the accommodating space 28, and the delivery robot opens or closes the opening 213 of the accommodating space 28 through the door plate 26. The two first support members 22 are located on opposite sides of the opening 213, so that after the door plate 26 are mounted on the two first support members 22, the opening 213 can be covered by the door plate 26, and the door plate 26 that covers the opening 213 can form a closed cavity with accommodating space 28. In the embodiment of the present disclosure, through the closed cavity containing the goods to be delivered that need to be delivered, the hygiene and safety of the goods to be delivered can be ensured, and the user experience and trust can be improved. At the same time, using the closed cavity on the casing 2 to contain the goods to be delivered that need to be delivered can effectively prevent the loss of the goods, ensure that the goods to be delivered can be correctly delivered to the user, and improve the safety of the goods to be delivered.

In an optional embodiment, as shown in FIGS. 14 to 17, the casing 2 includes the front side F1, the first side F2, and the second side F3, and the first side F2 and the second side F3 are connected to opposite sides of the front side F1, respectively. The opening 213 is provided on the front side F1, one of the first support members 22 is provided on the first side F2, and the other one of the first support members 22 is provided on the second side surface F3. That is, in this embodiment, the two first support members 22 are respectively mounted on the first side F2 and the second side F3 of the casing 2 at positions adjacent to the front side F1 where the opening is located, and the two first support members 22 are located on opposite sides of the opening 213, thereby facilitating the mounting and use of the door plate 26.

Further, as shown in FIGS. 16 to 17, the enclosure assembly 249 includes the side plate 25 and the top plate 24. One end of the side plate 25 is connected to one of the first support members 22, and the other end of the side plate 25 is connected to the other one of the first support members 22. The top plate 24 is connected to top ends of the side plate 25 and two first support members 22. The accommodating space 28 is enclosed by the side plate 25, the top plate 24, and the two first support members 22. In this embodiment, the side plate 25 may be an integrally formed U-shaped plate as shown in FIG. 17, but the side plate 25 may also be composed of a plurality of plates arranged separately. The shape of the side plate 25 is not limited to the U-shape as shown in FIG. 17, as long as the effect of forming the accommodating space 28 by the side plate 25, the top plate 24, and the two first support members 22 can be ultimately achieved. The top plate 24 is provided on the top ends of the side plate 25 and the two first support members 22, and the shape of the top plate 24 can be set as required.

In an embodiment, as shown in FIG. 17, the casing 2 further includes two second support members 23, one of the second support members 23 is provided on the first side surface F2, and the other one of the second support members 23 is provided on the second side F3. One of the second support members 23 is located on a side of one of the first support members 22 away from the front side F1, and the other one of the second support members 23 is located on a side of the other one of the first support members 22 away from the front side F1. The enclosure assembly 249 is mounted on the two second support members 23, so as to better support the enclosure assembly 249 through the two second support members 23, thereby enabling the overall structure of the casing 2 to be more stable. Specifically, the side plate 25 is attached to outer surfaces of the two second support members 23, and the two second support members 23 have a certain inclination (the inclination can be set as required), so that the side plate 25 can be better supported. In this embodiment, the top plate 24 is connected to the top ends of the two second support members 23.

In an embodiment, as shown in FIG. 14 and FIG. 15, the shape and opening and closing manner of the door plate 26 can be set as required. For example, the door plate 26 may be an integral door plate, or may be composed of two door plates (a first door plate 311 and a second door plate 312) as shown in FIGS. 14 to 16. The door plate 26 may be hinged to the casing 2, or may be slidably connected to the casing 2, as long as the opening 213 can be closed or opened.

In an embodiment, it further includes a driving device (not shown, the driving device may be a motor or an air cylinder, etc.) mounted on the casing 2. The driving device is connected to the door plate 26 and configured to drive the door plate 26 to cover or open the opening 213. That is, the door plate 26 can be controlled to automatically cover or open the opening 213 through the driving device. Further, as shown in FIG. 14, the delivery robot further includes a control module 4 mounted on the casing 2. The control module 4 is connected to the driving device, and the control module 4 is configured to control the driving device to drive the door plate 26 to cover or open the opening 213. That is, the control module 4 can be electrically or communicatively connected to the driving device, and a control command may be entered and sent to the driving device through the control module 4, and then the driving device can be controlled by the control command to close or open the door plate 26.

In an embodiment, as shown in FIGS. 14 to 16, the control module 4 includes a controller (not shown) connected to the driving device and a control screen 41 connected to the controller. The control screen 41 may be a flat liquid crystal display, and the user may perform control operations on the control screen 41 by touching, pressing, or the like. For example, the control screen 41 can generate control instructions configured to control the driving device to drive the door plate 26 to open and close. The control instruction can be transmitted to the driving device through the controller, and then the driving device is controlled to execute the control operation corresponding to the control instruction. At the same time, in some embodiments, the door plate 26 needs to be opened by a person with a certain authority. At this time, the user needs to first input verification information through the control screen 41, then the controller can verify the identity of the person according to the verification information, and then the control screen 41 and the controller generate control instructions configured to control the driving device to drive the door plate 26 to open and close. In some embodiments, the opening of the door plate 26 may also be controlled by face recognition or position recognition. For example, when the delivery robot recognizes a person with authority (such as a waiter) or recognizes that the position is the target position, the control instruction configured to control the drive device to drive the door plate 26 to open and close can be automatically generated.

Further, the control screen 41 is provided on the top end of the casing 2, and when the delivery robot stands on the ground, the control screen 41 is arranged at a first inclined angle with the horizontal plane. The first inclined angle can be set as required, the control screen 41 present an inclined angle that is convenient for the user to view through the first inclination angle, which not only facilitates the performance of the control operation, but also improves the experience of the user viewing the information to be displayed. It should be understood that the top portion refers to a portion of a top position of the delivery robot when the delivery robot is in the upright normal use state shown in FIG. 15.

In an embodiment, as shown in FIG. 14 and FIG. 15, the door plate 26 includes the first door plate 311 and the second door plate 312 that are mounted on the casing 2, and the first door plate 311 and the second door plate 312 are located on opposite sides of the opening 213. In this embodiment, the door plate 26 is composed of the first door plate 311 and the second door plate 312. At this time, when the opening 213 is opened, the first door plate 311 and the second door plate 312 move away from each other, and then the opening 213 is opened and the opening 213 needs to be covered, the first door plate 311 and the second door plate 312 move toward each other, and finally being attached to each other to close the accommodating space 28 to form the closed cavity. As shown in FIGS. 14 to 16, the first door plate 311 of the door plate 26 is mounted on one of the first support members 22, and the second door plate 312 is mounted on the other one of the first support members 22.

In an embodiment, as shown in FIG. 14 and FIG. 15, the first door plate 311 is provided with a first protruding strip 313, and the second door plate 312 is provided with a second protruding strip 314. The design of the first protruding strip 313 and the second protruding strip 314 can increase the aesthetics of the delivery robot, and the first protruding strip 313 and the second protruding strip 314 can be regarded as the hands of the delivery robot in appearance, so that the delivery robot is more user-friendly. In addition, the first protruding strip 313 and the second protruding strip 314 can be used as handles for manually opening the door plate 26. In an embodiment, as shown in FIG. 14 and FIG. 16, the casing 2 includes at least one tray 3 provided in the accommodating space 28 and configured to divide the closed cavity. The tray 3 may be provided with one or more pieces, so as to divide the closed cavity into a plurality of storage compartments of different sizes, to accommodate the goods to be delivered of different volumes. Further, the tray 3 is provided with a plurality of pieces, and the plurality of trays 3 are spaced apart in parallel. As shown in FIG. 14, two trays 3 are provided in the accommodating space 28, and as shown in FIG. 16, three trays 3 are provided in the accommodating space 28, but in an optional embodiment of the present disclosure, the number of trays 3 may be set as required, and the distances between the trays 3 may be equal or unequal. It should be understood that in some embodiments, in order to form the storage compartments that meet different storage requirements (e.g., different storage compartment sizes and different plate inclinations, etc.), the trays 3 may not be parallel to each other.

In an embodiment, the casing 2 further includes at least one second partition (not shown) provided in the accommodating space 28 and configured to divide the closed cavity, and the second partition is provided at a second inclined angle with the trays 3. In an optional embodiment of the present disclosure, the number of second partitions can be set to one or more as required. Further, a plurality of the second partitions are provided, and the plurality of second partitions are spaced apart (the plurality of the second partitions may be parallel or non-parallel, a second inclination angle between the second partition and the tray 3 may be set as required), and the distances between the second partitions may be equal or unequal. As an optional embodiment, the second partition is arranged with an angle of 90 degrees to the tray 3, that is, the second partition is perpendicular to the tray 3. In an optional embodiment, as shown in FIG. 14, the opening 213 is provided on the front side F1 of the casing 2, and the rear side of the casing 2 is provided with a reference plane opposite to the opening 213, which is perpendicular to the horizontal plane when the delivery robot is in an upright working state. The tray 3 and the second partition are perpendicular to the reference plane. Further, the second inclination angle between the tray 3 and the second partition includes but is not limited to 90 degrees. In some embodiments, the tray 3 is perpendicular to the height direction of the delivery robot, and when the delivery robot is in the upright working state, the height direction of the delivery robot is perpendicular to the horizontal plane. According to the above description, the tray 3 and the second partition plate can form storage compartments with different volumes, so as to accommodate different volumes of goods to be delivered.

In an embodiment, as shown in FIG. 16, the casing 2 further includes a positioning portion 221 provided on an inner wall of the accommodating space 28, and the tray 3 or/and the second partition are detachably connected to the positioning portion 221. That is, each of the trays 3 or the second partition may be detachably connected to the inner wall of the accommodating space 28 through one or more positioning portions 221, and the number of positioning portions 221 may be may be greater than the total number of the tray 3 and the second partition, so that the tray 3 or the second partitions can be selectively mounted on different positioning portions 221, and the volume of the storage compartment in the accommodating space 28 can be adjusted at any time, thereby increasing the application scope of the delivery robot. Further, the positioning part 221 includes but is not limited to being mounted on the two first support members 22 and the two second support members 23 shown in FIG. 17, so that the positioning and mounting effect of the positioning part 221 is more stable.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A delivery robot, comprising:

a mobile chassis;

a casing provided on the mobile chassis, wherein the casing comprises a bottom plate, at least two first support members, and a top plate, the bottom plate is provided on a top portion of the mobile chassis, the at least two first support members are provided between the bottom plate and the top plate, the at least two first support members are respectively located on two sides of a front end or a rear end of the bottom plate, the front end of the bottom plate is a front side of the casing, and the rear end of the bottom plate is a back side of the casing; and a door plate movably connected to the first support members, wherein the casing is provided with an accommodating space having an opening, the door plate is openably provided on the opening, the door plate is configured to form a closed cavity to package goods to be delivered with the accommodating space when the door plate covers the opening, the casing comprises an enclosure assembly and two first support members, the two first support members are located on opposite sides of the opening, both of the enclosure assembly and the door plate are mounted on the two first support members, and the accommodating space is enclosed by the enclosure assembly and the two first support members, wherein the delivery robot further comprises a driving device mounted on the casing, and the driving device is connected to the door plate and is configured to drive the door plate to cover or open the opening.

2. The delivery robot according to claim 1, further comprising at least two second support members, wherein the first support member and the second support member are parallel to each other, or the first support member and the second support member form an angle with a preset degree.

3. The delivery robot according to claim 1, wherein a partial area of the top portion of the mobile chassis protrudes toward the bottom plate to form a protrusion, the bottom plate is provided on the protrusion, so that at least one accommodating space is formed between a bottom portion of the bottom plate and the top portion of the mobile chassis, and the delivery robot further comprises an electronic device accommodated in the accommodating space.

4. The delivery robot according to claim 1, wherein the chassis comprises a housing, a driving portion, and a caster, the casing is provided on a top portion of the housing, the caster is partly accommodated in the housing, and a bottom portion of the caster is exposed from an opening located at a bottom portion of the housing, the driving portion is provided in the housing, the driving portion is connected to the caster, and the driving portion drives the caster to roll, so as to drive the housing to move.

5. The delivery robot according to claim 2, further comprising a bottom fixing member configured to be fixedly connected to the mobile chassis, wherein the second support member is fixedly connected to the bottom fixing member.

6. The delivery robot according to claim 5, wherein the bottom fixing member is provided with a first connecting portion, an end of the second support member adjacent to the bottom fixing member is provided with a second connecting portion, and the first connection member is fixedly connected to the second connection member.

7. The delivery robot according to claim 6, further comprising a first auxiliary fixing member, wherein the second connecting portion is provided with a inserting slot, an inner wall of the inserting slot is provided with a first through hole, an inserting block is provided with a second through hole in communication with the first through hole, and the first auxiliary fixing member is configured to auxiliary fix the inner wall of the inserting slot to the inserting block through the first through hole and the second through hole.

8. The delivery robot according to claim 5, further comprising a second auxiliary fixture, a third auxiliary fixture, a first support member, and a connecting member, the first support member is spaced apart from the bottom fixing member, the connecting member is fixed between the bottom fixing member and the first supporting member, and the second auxiliary fixing member is configured to auxiliary fix the bottom fixing member to the connecting member, and the third auxiliary fixing member is configured to auxiliary fix the first supporting member to the connecting member.

9. The delivery robot according to claim 5, further comprising a tray provided with an engaging block, wherein an outer wall of the second support member is provided with an engaging slot, and the engaging block is engaged in the engaging slot.

10. The delivery robot according to claim 9, wherein the engaging block is provided with a third through hole, an inner wall of the engaging slot is provided with a fourth through hole that is in communication with the third through hole, the delivery robot further comprises a fourth auxiliary fixing member, the fourth auxiliary fixing member is configured to auxiliary fix the engaging block to the inner wall of the engaging slot through the third through hole and the fourth through hole.

11. The delivery robot according to claim 5, further comprising a top fixing member spaced apart from the bottom fixing member, wherein the second support member is fixed between the bottom fixing member and the top fixing member.

12. The delivery robot according to claim 1, wherein the enclosure assembly comprises a side plate and the top plate, one end of the side plate is connected to one of the first support members, the other end of the side plate is connected to the other one of the first support members, the top plate is connected to top ends of the side plate and two first support members, the accommodating space is enclosed by the side plate, the top plate, and the two first support members.

13. The delivery robot according to claim 1, wherein the casing comprises a front side, a first side, and a second side, the first side and the second side are connected to opposite sides of the front side, respectively, the opening is provided on the front side, one of the first support members is provided on the first side, and the other one of the first support members is provided on the second side surface.

14. The delivery robot according to claim 13, wherein the casing further comprises two second support members, one of the second support members is provided on the first side surface, the other one of the second support members is provided on the second side, one of the second support members is located on a side of one of the first support members away from the front side, and the other one of the second support members is located on a side of the other one of the first support members away from the front side.

15. The delivery robot according to claim 1, further comprising a control module mounted on the casing, wherein the control module is connected to the driving device, and the control module is configured to control the driving device to drive the door plate to cover or open the opening.

16. The delivery robot according to claim 15, wherein the control module comprises a controller connected to the driving device and a control screen connected to the controller, and the control screen is provided on a top end of the casing and is arranged at a first inclined angle with a horizontal plane.

17. The delivery robot according to claim 1, wherein the door plate comprises the first door plate and the second door plate both mounted on the casing, the first door plate and the second door plate are located on opposite sides of the opening, the first door plate is provided with a first protruding strip, and the second door plate is provided with a second protruding strip.

* * * * *